R. BEHR.
DETACHABLE GAS FITTING.
APPLICATION FILED APR. 30, 1913.
1,074,100.
Patented Sept. 30, 1913.
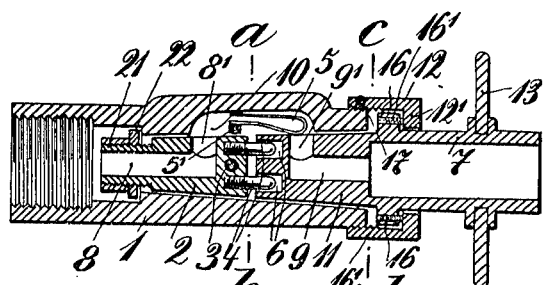
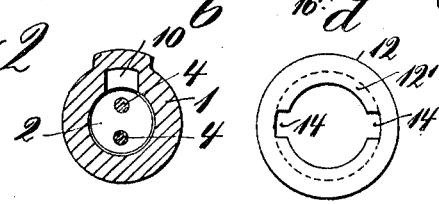
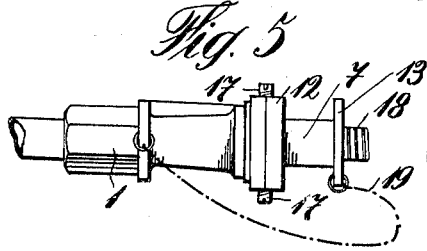
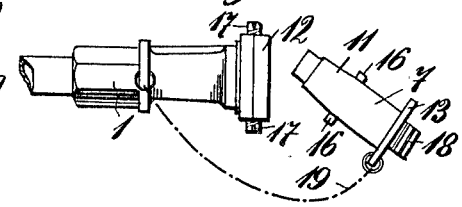
Witnesses:
James Anderson
Robert N. Pearsons
Inventor:
Rudolf Behr,
By David H. Fletcher,
his attorney.

UNITED STATES PATENT OFFICE.

RUDOLF BEHR, OF KOLBERG, GERMANY.

DETACHABLE GAS-FITTING.

1,074,100.  Specification of Letters Patent.  Patented Sept. 30, 1913.

Application filed April 30, 1913. Serial No. 764,558.

*To all whom it may concern:*

Be it known that I, RUDOLF BEHR, a citizen of the German Empire, residing at Kolberg, in the Kingdom of Prussia, Germany, have invented certain new and useful Improvements in Detachable Gas-Fittings; and I do hereby declare the following to be a full, clear, and exact description of the invention, such as will enable others skilled in the art to which it appertains to make and use the same.

My invention relates to improvements in detachable gas fittings and more particularly in gas fittings of the class which are used for temporarily connecting a gas fixture to the gas supply system.

The object of the improvements is to provide gas fittings of this class in which the valve which forms a part of the fittings and is inclosed in the gas supply pipe is not accessible from the outside and is closed by a locking device which can be set in nonlocking position exclusively by means of a key formed on the nipple of the fixture intended to be connected to the supply pipe, and in which the nipple is preferably constructed at its end in the form of a cock which has a tight fit in the supply pipe and provides a means for regulating the flow of the gas to the burner.

With this and other objects in view my invention relates to the matters described hereinafter and particularly pointed out in the appended claims.

For the purpose of explaining the invention an example embodying the same has been shown in the accompanying drawing, in which the same letters of reference have been used in all the views to indicate corresponding parts.

In said drawing Figure 1, is a longitudinal section of the gas fitting with the nipple of a fixture placed therein, Fig. 2, is a cross-section of the fitting taken on the line *a—b* of Fig. 1, Fig. 3, is a cross-section of the end of the nipple connected to the fixture taken on the line *c—d* of Fig. 1, Fig. 4, is a front view of the fittings with the nipple detached, Fig. 5, is a side view of the gas fittings with the nipple and flexible tube connected thereto, and Fig. 6, is a similar side view showing the nipple and flexible tube detached.

Referring to the example illustrated in the drawing, a gas supply pipe 1 is constructed at its end in the form of a valve the rotary plug 2 of which is held in position by means of a nut 21 and washer 22 and is formed with a longitudinal bore 8 adapted to communicate in the open position of the valve through a lateral branch 81 with a by-pass 10 made in the wall of the pipe 1. The valve plug 2 is adapted to be locked in closing position by a suitable locking member which in the example shown in the drawing consists of a flat and substantially U-shaped spring 5 located in the by-pass 10 and provided at its end bearing on the plug 2 with a nose 51 which is adapted to engage in the closed position of the valve plug in a notch 3 thereof. The locking member or spring 5 is disposed in such a position, that it is adapted to be engaged by a key or the like which is passed into the valve from the open end thereof, and when thus engaged it is pushed backward and releases the plug so as to permit the same to be turned for opening the valve.

The key for unlocking the plug is provided by the end of a nipple 7 which at its end is constructed in the form of a plug 11 and is adapted to be pushed into the pipe 1 for connecting the gas supply pipe with the fixture. As shown the plug 11 is formed with a longitudinal passage 9 having a lateral branch 91, which is adapted to be placed in communication with the by-pass 10, as has been illustrated in Fig. 1. At its end the plug 11 provided at the end of the nipple 7 is made in the form of a key by means of which the plug 2 can be turned in opening or closing position. For this purpose the plug 11 is formed with a pair of longitudinal bores 6 adapted to engage pins 4 secured to the outer end of the plug 2. When placed in the pipe 1 the nipple 7 is adapted to be held in position by means of a nut 12 screwed to the outer end of the pipe 1 and provided with an inner flange 121 formed with notches 14. At parts corresponding to the notches 14 the nipple 7 is provided with noses 16. By means of this construction the nipple 7 can be pushed into the pipe 1 with its noses passing through the notches 14, and after turning the tube it is locked in position by the noses 16. To insure a tight fitting of the plug 11 after wear of the parts the noses 16 are equipped with adjusting screws 161. After being set in its proper position the nut 12 is locked by a locking screw 17. For operating the nipple 7 it is equipped with a